US010728093B2

(12) United States Patent
Smaak et al.

(10) Patent No.: US 10,728,093 B2
(45) Date of Patent: Jul. 28, 2020

(54) MAIN DEVICE FOR USE IN A COMPUTER NETWORK, COMPUTER NETWORK, METHOD FOR CONFIGURING A COMPUTER NETWORK AND COMPUTER PROGRAM

(71) Applicant: Robert Bosch GmbH, Stuttgart (DE)

(72) Inventors: Marc Smaak, Bergen op Zoom (NL); Stephan Van Tienen, Bergen op Zoom (NL); Tom De Brouwer, Breda (NL)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 15/848,105

(22) Filed: Dec. 20, 2017

(65) Prior Publication Data

US 2018/0183669 A1  Jun. 28, 2018

(30) Foreign Application Priority Data

Dec. 22, 2016  (EP) .................................... 16206096

(51) Int. Cl.
*H04L 12/00* (2006.01)
*H04L 12/24* (2006.01)

(52) U.S. Cl.
CPC ...... *H04L 41/0816* (2013.01); *H04L 41/0806* (2013.01); *H04L 41/12* (2013.01); *H04L 41/14* (2013.01)

(58) Field of Classification Search
None
See application file for complete search history.

(56) References Cited

U.S. PATENT DOCUMENTS

| | | | | |
|---|---|---|---|---|
| 7,120,680 B1* | 10/2006 | Higgins | .................. | H04L 41/12 709/220 |
| 10,057,131 B1* | 8/2018 | Brown | ..................... | H04L 41/12 |
| 2007/0206512 A1* | 9/2007 | Hinds | ..................... | H04L 41/12 370/254 |
| 2009/0116404 A1 | 5/2009 | Mahop et al. | | |

(Continued)

FOREIGN PATENT DOCUMENTS

| | | |
|---|---|---|
| EP | 2424237 | 2/2012 |
| EP | 2518940 | 10/2012 |

*Primary Examiner* — Noel R Beharry
*Assistant Examiner* — Lionel Preval
(74) *Attorney, Agent, or Firm* — Michael Best & Friedrich LLP

(57) ABSTRACT

A main device for use in a computer network, wherein the computer network has a topology and comprises a plurality of interconnected devices, wherein each of the plurality of interconnected devices comprises device information and at least one network port, wherein the devices are interconnected with the computer network by network links, each network link connecting two respective network ports, wherein the main device is interconnected with at least one of devices by a connection, and configured to obtain network information, wherein the network information comprised the topology of the computer network and the device information of the plurality of interconnected devices in the network, retrieve a stored network model, wherein the network model comprises a defined topology of the computer network and defined device information, and compare the network information with the network model to provide the differences between the network information and the network model as distinction data.

13 Claims, 2 Drawing Sheets

(56) References Cited

U.S. PATENT DOCUMENTS

| | | | |
|---|---|---|---|
| 2010/0232317 A1* | 9/2010 | Jing | H04L 12/2807 370/254 |
| 2012/0254338 A1* | 10/2012 | Agarwal | H04W 40/246 709/208 |
| 2018/0131616 A1* | 5/2018 | LaBerge | H04L 47/125 |

* cited by examiner

MAIN DEVICE FOR USE IN A COMPUTER NETWORK, COMPUTER NETWORK, METHOD FOR CONFIGURING A COMPUTER NETWORK AND COMPUTER PROGRAM

BACKGROUND OF THE INVENTION

The invention provides a main device for use in a computer network, wherein the computer network has a topology and comprises a number of devices, wherein each of the devices comprises device information and at least one network port, wherein the devices are interconnected with the network by network links, each link connecting to respective network ports, wherein the main device is interconnected with at least one device by a connection, whereby the main device is adopted to obtain network information, whereby the network information comprises topology and device information of devices in the network.

Computer networks are collections of devices and/or computers interconnected by communication channels. These channels allow for sharing of resources and information. Computer networks consist of many individual devices, whereby the devices are connected and forming a specific network topology. The devices and/or computers are usually configured to correctly fulfill the requested task for the user. This configuration can be different for each individual device.

The document EP 2424237 A1, which seems to be the closest state of the art, describes a device for use in a digital conference system, wherein the device has a first and a second port in connection with each other and comprises configuration means for configuring, on receipt of a trigger signal, either the first or the second port as input port of the device and the other port as output port. The device is preferably a delegate unit or an extension unit.

SUMMARY OF THE INVENTION

According to the invention, a main device for use in a network is suggested, especially for a computer network. The invention also concerns a computer network, a method for configuring a computer network with devices and a computer program.

The invention describes a main device for use in a computer network. The main device is preferably a computer, a tablet, a phablet, a media device, any embedded device or any other application unit. The computer network is preferably a local network, for example a local area network (LAN), or a non-local network like a global area network. Preferably, the computer network comprises several main devices.

The computer network comprises a number of devices and has a topology. Particularly the devices together with the main device are forming the topology. Preferably, the computer network comprises more than ten devices, especially more than twenty devices and particularly more than one hundred devices. The computer network is for example an Ethernet network. Particularly, the devices are computers, sensors, actors, server, printers, media devices and/or delegate units. In special, the devices of the computer network are from the same type and/or from different types.

Each of the devices comprises at least one network port. Preferably, each of the devices comprises a number of network ports, for example more than two network ports. The network port may be a cable interface, for example an Ethernet port, a BNC-connector or a fiber optic cable connector. Alternatively, the network port is a wireless interface, like a Wi-Fi or other wireless interface. The devices are interconnected with the network by network links. Each link is connected to respective network ports. Particularly, the interconnected devices form the computer network. The network links are especially cables, for example twisted pair cables. Alternatively, the network links are wireless links like a Wi-Fi-link between the devices. The interconnection between the devices is adopted for a data exchange between the devices.

Particularly, the layout of the computer network is referred as the topology. Preferably, the computer network is a subset and/or part of a larger computer network, whereby the topology is at least a part of the topology of the larger computer network. Especially, the topology is the arrangement of the devices and/or the main device of the computer network. The topology especially comprises a physical topology, whereby the physical topology is the placement of the devices of the computer network, including the device location and network link installation. The topology may also comprise a logical topology, whereby the logical topology illustrates how data flows within the computer network, regardless of the physical design.

The main device is interconnected with at least one of the devices by a connection. Preferably, the connection is also a network link, for example a cable link. Alternatively, the connection between main device and at least one of the devices may be an internet connection. Especially the connection between main device and at least one of the devices may be a direct connection, alternatively the connection between the device and main device may be an interact connection, whereby for example the indirect connection comprises an interstation.

The main device might also be interconnected with a least one of the other main devices by a connection. Preferably, the connection is also a network link, for example a cable link. Alternatively, the connection between main device and at least one of the devices may be an internet connection. Especially the connection between main device and at least one of the devices may be a direct connection, alternatively the connection between the device and main device may be an interact connection, whereby for example the indirect connection comprises an interstation.

The main device is adopted to obtain network information. Especially the connection between the main device and the devices is obtained to exchange data, whereby the data exchange between the main device and the devices is used for obtaining the network information. For example, the main device is adopted to obtain network information from each of the devices in the computer network. The network information comprises the topology and the device information of the devices in the network. Especially, the network information comprises a local topology, wherein the local topology is preferably the topology around the device, whereby all the local typologies of all devices in the computer network may be used to get the topology of the whole computer network. The device information may comprise the local topology. Especially the device information comprises configuration data of the device and/or comprises information about what kind of device the device is. Particularly, the device information also comprises information about the network ports and/or the capabilities of the device.

The main device comprises a network model. Especially, the network model is stored in the main device, whereby the main device comprises a data carrier for storing the network model. The network model comprises a defined topology and defined device information. The defined topology is for example a given, adjusted, automatically learned and/or configured topology of the computer network, for example a user configured topology. Alternatively, the defined topology is the topology of the past, for example the topology obtained at initialization of the computer network. The defined device information is maybe a user defined device information and/or given device information. Alternatively, the defined device information are the device information obtained in the initialization of the computer network.

The main device comprises a comparison unit. The comparison unit is adopted to compare the network information with the network model to provide differences between the network information and the network model as distinction data. Preferably, the comparison unit is adopted to compare the defined topology with the topology of the network information. Especially, the comparison unit is adopted to compare the defined topology with the actual topology. Particularly the comparison unit is adopted to compare the defined device information with the device information of the network information especially with the actual device information. In particular, the comparison unit is adopted to compare the defined device information of each of the devices with the actual device information of each and/or the respecting device information. The distinction data therefore particularly comprise the differences in the topology and/or the differences in the device information of the devices. Particularly, the distinction data associates the differences in the topology to the respecting device information.

Advantage of the invention is the supply of at least one main device that is able to report fast and error-secure the differences between a defined topology and a defined device information and the actual topology and/or the actual device information.

Advantageously, the device information contains a unique address of the device. Preferably, the network information contains all unique addresses of the devices of the computer network. Particularly, the unique address of the device is a worldwide unique address, especially an address, that is defined when the device is produced. For example, the computer network is an Ethernet network, wherein the unique address is a MAC address. Preferably, the network information comprises a defined unique address for each device, whereby the comparison unit is adopted to compare the actual unique addresses and/or the unique addresses of the network information with the unique addresses in the network model. Advantage of this embodiment is, that the comparison of MAC addresses and/or unique addresses enable a fast obtaining of distinction data.

Preferably, the main device comprises a detection unit. The detection unit is adopted to detect based on the distinction data a new device in the computer network. Especially, the detection unit is adopted to detect based on the distinction data all new devices and/or changed devices in the computer network. Particularly, the detection unit is adopted to detect chances in the device information, e.g. a change in the configuration data. Particularly, the detection unit is adopted to detect based on detected differences in the topology, detected differences in the device information and/or detected differences in the unique addresses of the devices, a new device and/or all new devices in the computer network. Preferably, a device with changed device information is also seen as a new device. Benefit of this embodiment is, that a quick and fast detection of new devices in the computer network is possible just based on the distinction data.

Preferably, the detection unit is adopted to ascertain based on the distinction data if the new device is a replacement device or an extension device. Especially, the detection unit is adopted to ascertain based on the local topology around a device, if the device related to the local topology is a replacement device or an extension device. For example, a device with a changed unique address and/or changed device information is a replacement device, if the local topology around this device is the same topology as for a device in the defined topology. For example, the distinction data contains the information about the network ports and/or which network port of which device is connected to which network port of another device. A new device, which has no local topology that is similar or equal to a local topology in the defined topology, is seen as a new device. For example, a first device is able to detect the unique address of its neighbors and to send it to the main device, whereby the main device is operable to detect, if a new device is a replacement for a device based on the unique addresses of the neighbors of the devices. Benefit of this embodiment is to detect, if changes in a computer network are an extension of the computer network or a replacement of devices.

Advantageously, the defined device information comprises configuration data. The configuration data for example contain the configuration of the device according to its nature and chief characteristics. Especially, the configuration data contain the settings of the characteristics of the device. Preferably, the configuration data is a collection of the data that has to be adjusted by a user, before and/or to use the device in the computer network. Preferably, the main device comprises a configuration unit. The configuration unit is adopted to import the defined configuration data to the replacement device. Alternatively the configuration unit is located in the device for auto configuration. Especially, the configuration unit is adopted to import the configuration data to all of the replaced devices in the computer network. Especially, the configuration unit is adopted to import the assigned configuration data of the defined device information to the corresponding replacement device.

In a preferred embodiment of the invention at least one device of the devices in the computer network is a main device. Preferably, all devices of the computer network are main devices. Benefit of this embodiment is a decentral intelligence, whereby more than one device in the computer network is operable to detected changes in the computer network.

According to the invention, a computer network is suggested. The computer network comprises a main device and a number of devices, especially more than ten devices. Each of the devices comprises device information and at least one network port. The devices are interconnected with the network by network links, each link connecting to respective network ports. The connected devices are forming the computer network, whereby the computer network has a topology. The topology is preferably defined by the physical and/or logical arrangement of the devices.

The main device is interconnected with at least one of the devices by a connection. The connection is preferably a cable connection, alternatively the connection is a wireless connection. The main device is adopted to obtain network information, whereby the network information comprises device information and the topology of the computer network. Device information comprise preferably the configuration of the device, the information about the ports of the device and information about which port of the device is connected with which port of another of the devices. Preferably, the device information comprises the information about the local topology around the device. The main device comprises a network model, whereby the network model comprises a defined topology and a defined device information. Preferably the network model comprises the device information of all devices of the computer network. The defined topology and/or the defined device information are preferably the topology and the device information after initialization or after initialization of the computer network. The main device comprises a comparison unit, whereby the comparison unit is adopted to compare the network information with a network model to provide the differences between the network information and the network model as distinction data.

Advantage of the invention is to provide a computer network that is able to provide and/or detect differences between the actual computer network and the computer network at a previous time, for example at the initialization of the computer network.

In a preferred embodiment of the invention each of the devices has a unique address. Preferably the unique address of the devices is a MAC address. The devices are adopted to detect the unique address of its neighbors and/or to detect the local topology around itself, especially the local topology together with the unique addresses of the neighbors. The device information of the devices contains its own unique address and the unique addresses of its neighbors and/or the local topology together with the unique addresses of the local topology. Preferably, the devices are adopted to provide the device information, especially the unique address of itself and the unique addresses of its neighbors, to the main device. Preferably the comparison unit is adopted to provide differences between the unique addresses of the devices and the defined unique addresses, for example at the point of initialization of the computer network. Benefit of this embodiment is, that for detecting differences in the computer network unique addresses, like the MAC address, is used, and therefore a fast and clear detection of differences in the computer networks are possible.

Preferably the network information and/or the device information comprise the physical position of the device. For example, the network information and/or the device information comprise the physical topology of the computer network. Alternatively the device information comprises part of the physical topology. Particularly, the device information comprises the capabilities of the device.

In a preferred embodiment of the invention the network information and/or the network model comprise surround information, wherein the surround information comprise information about which device is connected with which other device and connected with which network port. Preferably the surrounding information contain the local topology around the device. Benefit of this embodiment is, that the surrounding information may be used for a fast reconstruction and comparison of the actual network and the network at a previous time, for example at initialization. Another example is at device replacement.

Preferably, the detection unit is adopted to detect based on the distinction data a new device in the computer network. The detection unit is adopted to ascertain if the new device is a replacement device or an extension device in the computer network. Preferably the detection unit is adopted to ascertain if the new device is a replacement device or an extension device based on the surrounding information. For example, for a new device the local topology is compared with all the local topologies in the network model, whereby for a corresponding local topology the new device is a set as a replacement device. The main device comprises a configuration unit. The device information comprises configuration data. The configuration unit is adopted to import the configuration data of a replaced device in the corresponding replacement device. Advantage of this embodiment is, that the computer network enables a fast detection of replaced devices and an automatically configuration of the replaced devices, wherein only extension devices have to be configured by the user self.

Preferably, the main device and/or the devices in the computer network are running a network discovery protocol to discover the network topology and/or to discover the local topology around itself. In particular, the network discovery protocol is the Link Layer Discovery Protocol (LLDP).

Furthermore, the invention concerns a method for configuring a computer network with devices. In a first step of the method the topology of the computer network and device information of the devices are discovered and provided as network information. The provided network information is compared with a network model. The method has a further step, wherein the differences between the network model and the network information are detected and provided as distinction data. A new device is discovered based on the distinction data. Further, based on the distinction data it is checked, if the new device is a replacement of a device and/or is an extension of the computer network.

Benefit of the method for configuring a computer network is, that the method enables the possibility to automatically detect, if a device in the computer network is replaced and/or if a new device in the computer network is a replacement or an extension of the computer network.

According to the invention, also a computer program with program code means for executing all steps of the method for configuring a computer network with devices is suggested. The program is adopted to execute all the steps if the program is executed on a computer, the main device and/or a device of the computer network.

DETAILED DESCRIPTION

Figure 1:
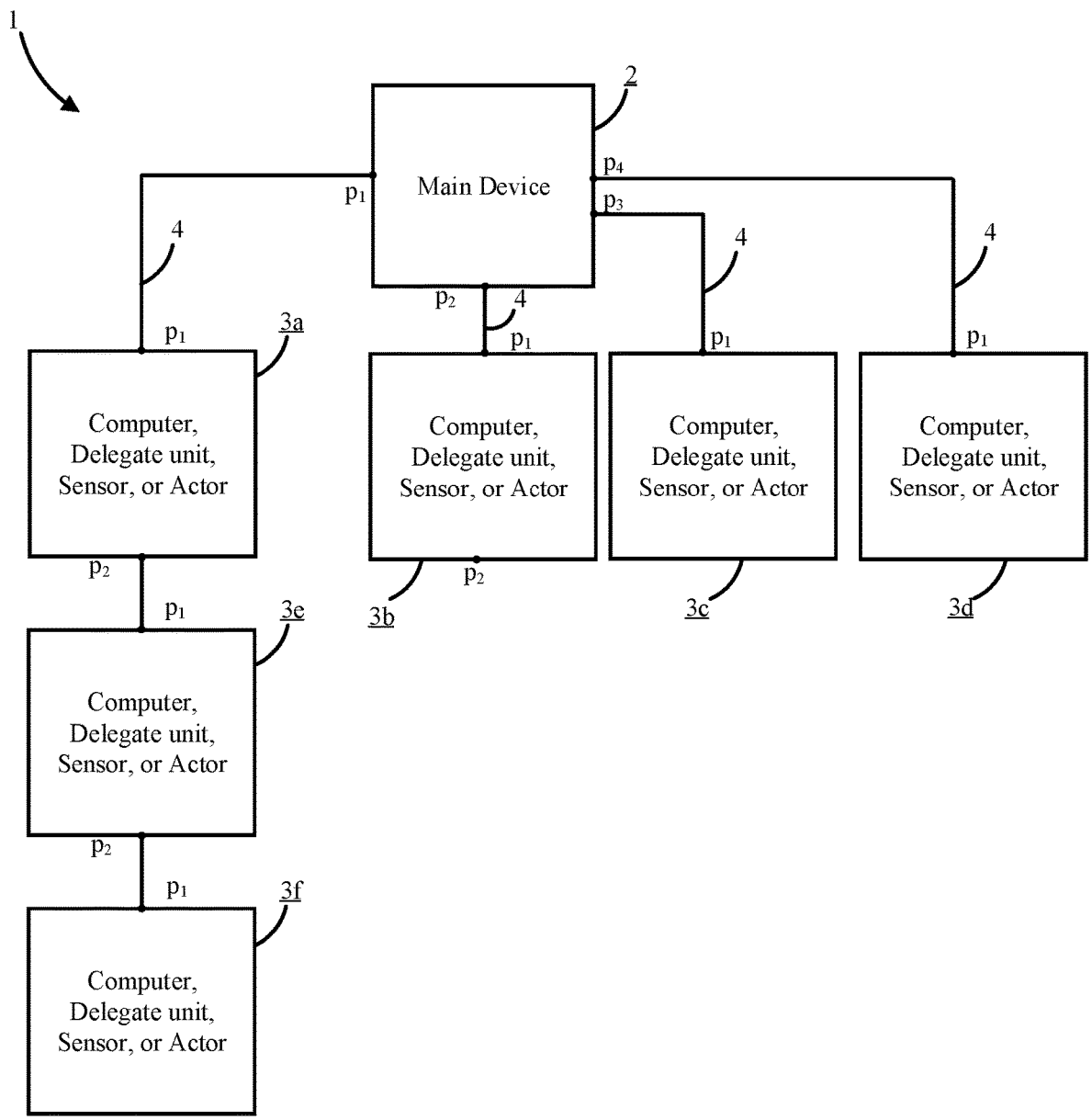
FIG. 1 a computer network after initialization.

FIG. 1 shows a computer network 1 comprising a main device 2 and several devices 3a, 3b, 3c, 3d, 3e and 3f. The main device 2 is for example a computer, a tablet computer or a phablet. The devices 3a to 3f are for example computers, delegate units, sensors or actors. The main device 2 comprises several network ports P1, P2, P3, P4, which are for example cable connectors or Wi-Fi-ports. The network ports P1, P2, P3, P4 and/or the main device 2 is adopted to run a network discovery protocol, for example the Link Layer Discovery Protocol (LLDP). The main device 2 is connected with several of the devices 3a-3f, in this example the devices 3a, 3b, 3c and 3d via a connection. The devices 3a to 3f comprise network ports, whereby each of the devices 3a to 3f comprise at least one network port or more network ports P1, P2. The main device 2 is connected via a network link 4 with the devices 3a, 3b, 3c and 3d, whereby the network port P1 of the main device 2 is connected with the network port P1 of the device 3a, the network port P2 of the main device 2 is connected with the network port P1 of the device 3b, the network port P3 of the main device 2 is connected with the network port P1 of the device 3c and the network port P4 of the main device 2 is connected with the network port P1 of the device 3d. The connection between two ports is done with a network link 4, whereby the network link 4 is for example a cable, alternatively the network link 4 is a Wi-Fi- or wireless connection.

The device 3a is connected with the device 3e, whereby the network port P2 of the device 3a is connected via a network link 4 with the network port P1 of the device 3e. The device 3e is connected with a device 3f, whereby the connection is done by connecting the network port P2 of the device 3e with the network port P1 of the device 3f. The network ports P1 and P2 of the devices 3a to 3f are also adopted to do a network discovery, for example by running a network discovery protocol like the LLDP.

The devices 3a to 3f are adopted to discover their neighbors and detect, which network port P1, P2 is connected with which neighbor and which network port of the neighbor, whereby the neighbor is another device 3a to 3f. The devices 3a to 3f are running die LLDP protocol, which is vendor neutral network protocol, that allows to advertise the other devices its presence and major capabilities. Especially, the devices 3a to 3f are adopted to discover the neighborhood and/or the local topology around their self, whereby the local topology is the physical and/or logical build-up of the network around itself. The devices 3a to 3f are adopted to provide the local topology, device information and/or further information to the main device 2. The device information for example comprise capabilities of the device 3a to 3f and/or configuration data.

The main device 2 is adopted to discover the whole topology of the network 1, for example by merging the local topologies. The main device 2 comprises a storage device, whereby the storage device is adopted to store a network model of the computer network 1. The network model comprises a defined topology of the computer network 1 and defined device information for the device of 3a to 3f. The defined topology and the defined device information are for example the topology of the computer network 1 and the device information of the devices 3a to 3f after initialization of the computer network 1. The main device 2 comprises a comparison unit, whereby the comparison unit is adopted to compare the network information with the actual network information, whereby the actual network information comprises the actual topology of the computer network 1 and the actual device information of the devices 3a to 3f. The comparison unit is further adopted to provide the differences between the network model and the actual network information as distinction data.

Figure 2:
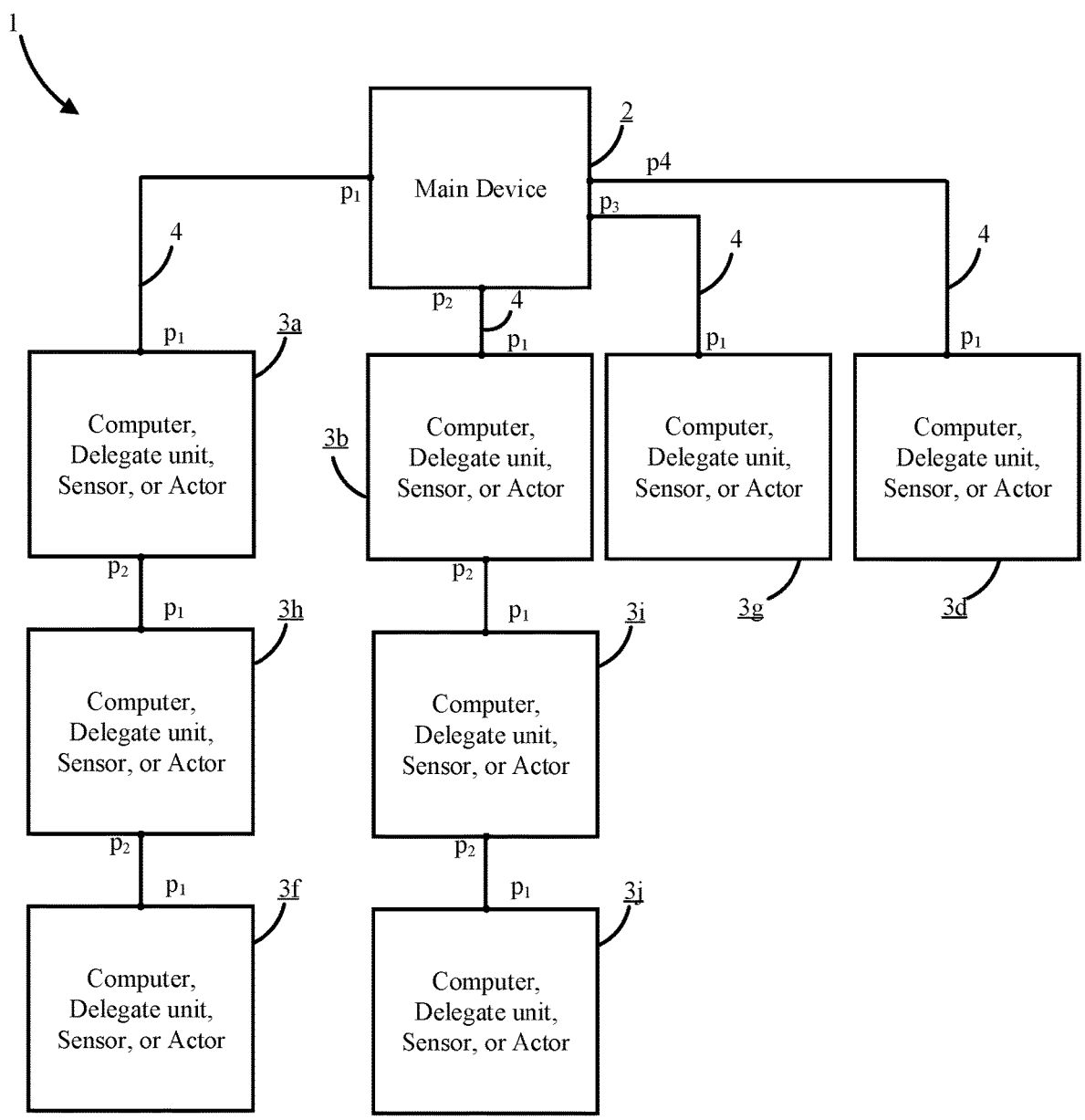
FIG. 2 the computer network of FIG. 1 with replacement devices and extension devices.

FIG. 2 shows an evolution of the computer network 1 from FIG. 1. The devices 3c and 3e from FIG. 1 are replaced by new devices 3g and 3h. Further, two new devices 3i and 3j are introduced in the computer network 1 and are forming an extension of the computer network 1.

The device 3c from FIG. 1 is replaced by the device 3g, whereby the device 3g has a port P1, whereby the port P1 of the device 3g is connected with the port P3 of the main device 2. The comparison unit is adopted to compare the network information, especially the device information of the device 3g, with the network model, especially the device information of the device 3c.

The main device 2 comprises a detection unit, whereby the detection unit is adopted to ascertain, that the device 3g is a replacement of the device 3c in FIG. 1, whereby this ascertain is based on the information, that the device 3g is connected with the port P3 of the main device 2 and that the device 3g has the same capabilities as the device 3c from FIG. 1. The main device 2 further comprises a configuration unit, whereby the configuration unit is adopted to configure the device 3g, for example by using the configuration data from device 3c.

The device 3e from FIG. 1 is replaced by the device 3h in FIG. 2. The comparison unit is adopted to compare the network model with the actual network information. The detection unit is adopted to recognize, that the device 3h is the replacement for the device 3e in FIG. 1, whereby this detection is based on the information, that the device 3h is connected with the network port P2 of the device 3a and connected with the network port P1 of the device 3f. The configuration unit is adopted to configure the device 3h with the configuration data of the device 3e, whereby the configuration data of the device 3e are comprised by the network model.

The devices 3i and 3j are extension devices of the computer network and forming replacement devices 3i and 3j. The comparison unit of the main device 2 is adopted to compare the network model with the actual network information, whereby this comparison is providing the information, that the devices 3i and 3j are new devices. The detection unit detects this devices 3i and 3j as extension devices 3i and 3j, since there was no connection to the network port P2 of the device 3b.

The invention claimed is:

1. A computer for use in a computer network, wherein the computer network has a topology and comprises a plurality of interconnected devices, wherein each of the plurality of interconnected devices comprises device information and at least one network port, wherein the plurality of interconnected devices are interconnected with the computer network by network links, each network link connecting two respective network ports, wherein the computer is interconnected with at least one of the plurality of interconnected devices by a connection, and configured to
    obtain network information, wherein the network information comprises the topology of the computer network and the device information of the plurality of interconnected devices in the network;
    retrieve a stored network model, wherein the network model comprises a defined topology of the computer network and defined device information;
    compare the network information with the network model to provide the differences between the network information and the network model as distinction data;
    detect based on the distinction data a new device in the computer network;
    identify the new device based on the distinction data as a replacement device when the new device has the same network link as one of the plurality of interconnected devices; and
    identify the new device based on the distinction data as an extension device when the new device does not have the same network link as any of the plurality of interconnected devices.

2. The computer as in claim 1, wherein the device information contains a unique address of the device.

3. The computer as in claim 1, wherein the defined device information comprise configuration data, wherein the computer is further configured to, in response to identifying the new device as a replacement device, import the configuration data in the new device.

4. The computer as in claim 1, wherein at least one of the plurality of interconnected devices of the computer network is a computer.

5. A computer network system comprising
    a computer network, wherein the computer network has a topology;
    a plurality of interconnected devices, wherein each of the plurality of interconnected devices comprises device information and at least one network port, wherein the plurality of interconnected devices are interconnected with the computer network by network links, each network link connecting two respective network ports, a computer interconnected with at least one of the plurality of interconnected devices by a connection, and configured to obtain network information, wherein the network information comprises the topology of the computer network and the device information of the plurality of interconnected devices in the network;

retrieve a stored network model, wherein the network model comprises a defined topology of the computer network and defined device information; and compare the network information with the network model to provide the differences between the network information and the network model as distinction data;

detect based on the distinction data a new device in the computer network;

identify the new device based on the distinction data as a replacement device when the new device has the same network link as one of the plurality of interconnected devices; and identify the new device based on the distinction data as an extension device when the new device does not have the same network link as any of the plurality of interconnected devices.

6. The computer network system as in claim 5, wherein each of the plurality of interconnected devices has a unique address and is adopted to detect the unique address of its neighbors, wherein the device information of the device contain its own unique address and the unique addresses of the neighbors.

7. The computer network system as in claim 5, wherein the network information, the device information, or both comprise a physical position of the device.

8. The computer network system as in claim 5, wherein the network information, the network model, or both comprise surrounding information, wherein the surrounding information comprises information about which device is connected with which device and via which network ports.

9. The computer network system as in claim 5, wherein the defined device information comprises configuration data, wherein the computer is further configured to, in response to identifying the new device as a replacement device, import the configuration data in the new device.

10. The computer network system as in claim 5, wherein the computer or at least one of the plurality of interconnected devices are running a network discovery protocol to discover the topology of the computer network.

11. The computer network system as in claim 5, wherein at least one of the plurality of interconnected devices is a computer.

12. A method for configuring a computer network with devices, the method comprising:

obtaining network information, wherein the network information comprises a topology of the computer network and device information of the devices;

retrieving a stored network model, wherein the network model comprises a defined topology of the computer network and defined device information;

comparing the network information with the network model to provide the differences between the network information and the network model as distinction data;

identifying the new device based on the distinction data as a replacement device when the new device has the same network link as one of the plurality of interconnected devices; and identifying a new device based on the distinction data as an extension of the computer network when the new device does not have the same network link as any of the plurality of interconnected devices.

13. A non-transitory computer-readable medium with program code means for executing all steps of the method of claim 12.

* * * * *